(12) United States Patent
Kunugi et al.

(10) Patent No.: US 10,538,877 B2
(45) Date of Patent: Jan. 21, 2020

(54) PROCESSING DEVICE, SHEET MANUFACTURING APPARATUS, PROCESSING METHOD, AND SHEET MANUFACTURING METHOD

(71) Applicant: SEIKO EPSON CORPORATION, Tokyo (JP)

(72) Inventors: Masanao Kunugi, Fujimi-machi (JP); Satomi Yoshioka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 99 days.

(21) Appl. No.: 15/954,810

(22) Filed: Apr. 17, 2018

(65) Prior Publication Data
US 2018/0305868 A1   Oct. 25, 2018

(30) Foreign Application Priority Data
Apr. 24, 2017   (JP) .................................. 2017-085119

(51) Int. Cl.
*D21B 1/08*   (2006.01)

(52) U.S. Cl.
CPC ...................................... *D21B 1/08* (2013.01)

(58) Field of Classification Search
None
See application file for complete search history.

(56) References Cited

U.S. PATENT DOCUMENTS

| | | | |
|---|---|---|---|
| 4,744,181 A * | 5/1988 | Moore ..................... | B24C 1/003 134/7 |
| 5,223,090 A * | 6/1993 | Klungness ............. | D21C 9/004 162/9 |
| 5,853,493 A * | 12/1998 | Skelton ................... | B24C 1/003 134/7 |
| 6,200,416 B1 * | 3/2001 | Brotto .................... | D21H 17/65 162/4 |

FOREIGN PATENT DOCUMENTS

JP   2000-284657 A   10/2000

* cited by examiner

*Primary Examiner* — Dennis R Cordray
(74) *Attorney, Agent, or Firm* — Global IP Counselors, LLP (57) ABSTRACT

A processing device, a sheet manufacturing apparatus, a processing method, and a sheet manufacturing method enable quickly removing color material when color material is contained in a material containing fiber. A processing device has a defibrator configured to defibrate, in air, fibrous material containing fiber; and a particle supply device configured to supply particles of dry ice to the material containing fiber during defibration or after defibration. The material containing fiber contains color material; and the particles work to separate the color material for the fibers by colliding with the color material contained in the material containing fiber.

13 Claims, 6 Drawing Sheets

PROCESSING DEVICE, SHEET MANUFACTURING APPARATUS, PROCESSING METHOD, AND SHEET MANUFACTURING METHOD

BACKGROUND

1. Technical Field

The present invention relates to a processing device, a sheet manufacturing apparatus, a processing method, and a sheet manufacturing method.

2. Related Art

As concerns about the environment and environmental awareness have increased, there is growing interest in not only reducing the amount of paper (recording media) that is used in the workplace, but also in recycling and remanufacturing paper in the workplace.

JP-A-2000-284657, for example, describes, as a method of recycling recording media, a method of spraying the recorded layer (printed surface) of a used recording medium, which is a paper sheet and has been printed on, with a blasting material to remove the recorded layer. After the recorded layer has been removed, the recording medium can then be used again.

However, the recycling method described in JP-A-2000-284675 sprays sheets of the recording medium with the blasting material. The blasting material therefore does not reach ink that has penetrated deeply into the thickness of the recording medium, and as a result cannot remove ink sufficiently. Furthermore, to completely remove such ink, the recording medium must be sprayed with the blasting material for a sufficient time, and a long time may be required to remove the ink.

SUMMARY

An objective of the several embodiments of the present invention is to provide a processing device, a sheet manufacturing apparatus, a processing method, and a sheet manufacturing method capable of quickly removing color material when color material is included in a material containing fiber.

The present invention is directed to solving at least part of the foregoing problem, and may be embodied as described below.

A processing device according to the invention includes: a defibrator configured to defibrate, in air, fibrous material containing fiber; and a particle supply device configured to supply particles of dry ice to the material containing fiber during defibration or after defibration.

Thus comprised, when color material is contained in material containing fiber, the processing device can quickly remove the color material from the material containing fiber by the action of the particles of dry ice supplied from a particle supply device striking the color material.

In a processing device according to another aspect of the invention, the material containing fiber contains color material; and the particles separate the color material from the fibers by colliding with the color material contained in the material containing fiber.

Thus comprised, the color material is separated and removed from the fiber by collision with the particles.

A processing device according to another aspect of the invention preferably also has a color material recovery device configured to recover color material that was separated by collision with the particles.

Thus comprised, fiber that can later be used to form a sheet, and color material that can be discarded, can be separated.

Further preferably in a processing device according to another aspect of the invention, the color material recovery device uses differences in the size of the fiber and the color material to classify and recover the color material.

Thus comprised, fiber from which color material has been removed can then be used to make a sheet that can then be used as a recording medium.

Further preferably in a processing device according to another aspect of the invention, the color material recovery device uses differences in the specific gravity of the fiber and the color material to classify and recover the color material.

Thus comprised, fiber from which color material has been removed can then be used to make a sheet that can then be used as a recording medium.

Further preferably in a processing device according to another aspect of the invention, the material containing fiber from which the color material was separated is formed into a sheet; and the particles sublimate before the material containing fiber is formed into the sheet.

Thus comprised, particles being left in the material containing fiber after a sheet is formed can be prevented, and the resulting sheet is therefore of high quality. In addition, providing the processing device with a separate part for recovering particles is not necessary, and the configuration of the processing device is simplified.

Further preferably in a processing device according to another aspect of the invention, the particle supply device has an injector connected or disposed to the defibrator, and configured to inject the particles toward the material containing fiber in the defibrator.

The injected particles include particles that strike and contact color material adhering to the defibrated material. These particles can also remove the color material from the fibers. As a result, color material can be reliably removed from the fibers.

Further preferably, a processing device according to another aspect of the invention preferably also has a flow path connected to the defibrator to carry the material containing fiber after defibration; and the particle supply device has an injector connected to the flow path, and configured to inject the particles toward the material containing fiber passing through the flow path.

Thus comprised, particles can be supplied to material containing fiber that has been sufficiently defibrated. By supplying particles in this way, the particles can better contact more of the material containing fiber that was defibrated, and as a result can bombard and contact the color material. As a result, color material can be reliably removed from the material containing fiber.

Further preferably in a processing device according to another aspect of the invention, the material containing fiber is stirred and contacts the particles as a result of injecting the particles.

Thus comprised, contact (collision) between the color material adhering to fibers and the particles is promoted, and as a result color material can be sufficiently removed from the fiber.

Further preferably in a processing device according to another aspect of the invention, the average particle diameter of the particles when supplied to the material containing fiber is greater than or equal to 50 μm and less than or equal to 1000 μm.

Thus comprised, the particles can function sufficiently as separation particles separating color material from fibers. In addition, when the particles hit the fibers, damage to the fibers by collision with the particles can be prevented.

Another aspect of the invention is a sheet manufacturing apparatus comprising the processing device of the invention.

Thus comprised, the processing device can quickly remove color material from material containing fiber when color material is contained in the material containing fiber by particles of dry ice supplied from a particle supply device striking the color material. A sheet can also be manufactured from the material containing fiber from which color material was removed.

Another aspect of the invention is a processing method including a defibrating process of defibrating fibrous material containing fiber in air; and a particle supply process of supplying particles of dry ice to the material containing fiber during defibration or after defibration.

Thus comprised, when color material is contained in material containing fiber, the color material can be quickly removed from the material containing fiber by the particles of dry ice supplied in the particle supply process striking the color material.

A sheet manufacturing method according to another aspect of the invention includes: a defibrating process of defibrating in air fibrous material containing fiber; a particle supply process of supplying particles of dry ice to the material containing fiber during defibration or after defibration; and manufacturing a sheet from the material containing fiber after supplying the particles.

Thus comprised, when color material is contained in material containing fiber, the color material can be quickly removed from the material containing fiber by the particles of dry ice supplied in the particle supply process striking the color material. Sheets can be then be manufactured from the material containing fiber from which color material was removed.

Other objects and attainments together with a fuller understanding of the invention will become apparent and appreciated by referring to the following description and claims taken in conjunction with the accompanying drawings.

DESCRIPTION OF EMBODIMENTS

A processing device, a sheet manufacturing apparatus, a processing method, and a sheet manufacturing method according to the invention are described below with reference to the accompanying figures.

A processing device 1 according to the invention has a defibrator 13 that defibrates defibrated material M3 containing fiber (feedstock containing fiber) in air (ambient air), and a particulate supply device 25 that supplies particles RM of dry ice to the defibrated material M3 (feedstock containing fiber) during defibration or after the material is defibrated.

The processing method of the invention also includes a defibration step of defibrating defibrated material M3 containing fiber (feedstock containing fiber) in air, and a particulate supply step of supplying particles RM of dry ice to the defibrated material M3 (feedstock containing fiber) during or after the material is defibrated. This method is executed by the processing device 1.

As described below, the invention can quickly remove color material CM from the defibrated material M3 even when color material CM is included in the defibrated material M3 by, for example, the dry ice particles RM supplied from the particulate supply device 25 colliding with the color material CM. In addition, when the processing device 1 has a color material recovery device 28, the color material CM can also be recovered by the color material recovery device 28 after the color material CM is removed from the defibrated material M3. Removing the color material CM can be done quickly in this way.

More specifically, the process of the invention may also be characterized as a recovered paper deinking process. Conventional deinking processes submerge the recovered paper in water, mechanically and chemically (using surfactants or alkaline chemicals, for example) freeing coloring agents, and then removing the color material by a floating or screening cleaning method. Our invention, however, enables deinking the recovered paper using a dry deinking technology instead of soaking the recovered paper in water.

The sheet manufacturing apparatus 100 of the invention has a processing device 1. The sheet manufacturing method of the invention includes a defibration process of defibrating defibrated material M3 containing fiber (feedstock containing fiber), and a particulate supply process of supplying particles RM of dry ice, and manufactures sheets S from the defibrated material M3 (feedstock containing fiber) after the dry ice particles RM are supplied. This method is executed by the sheet manufacturing apparatus 100.

The invention thus comprised can take advantage of the features of the processing device 1 (processing method) described above while additionally manufacturing sheets S from the material after the dry ice particles RM are supplied.

Embodiment 1

Figure 1:
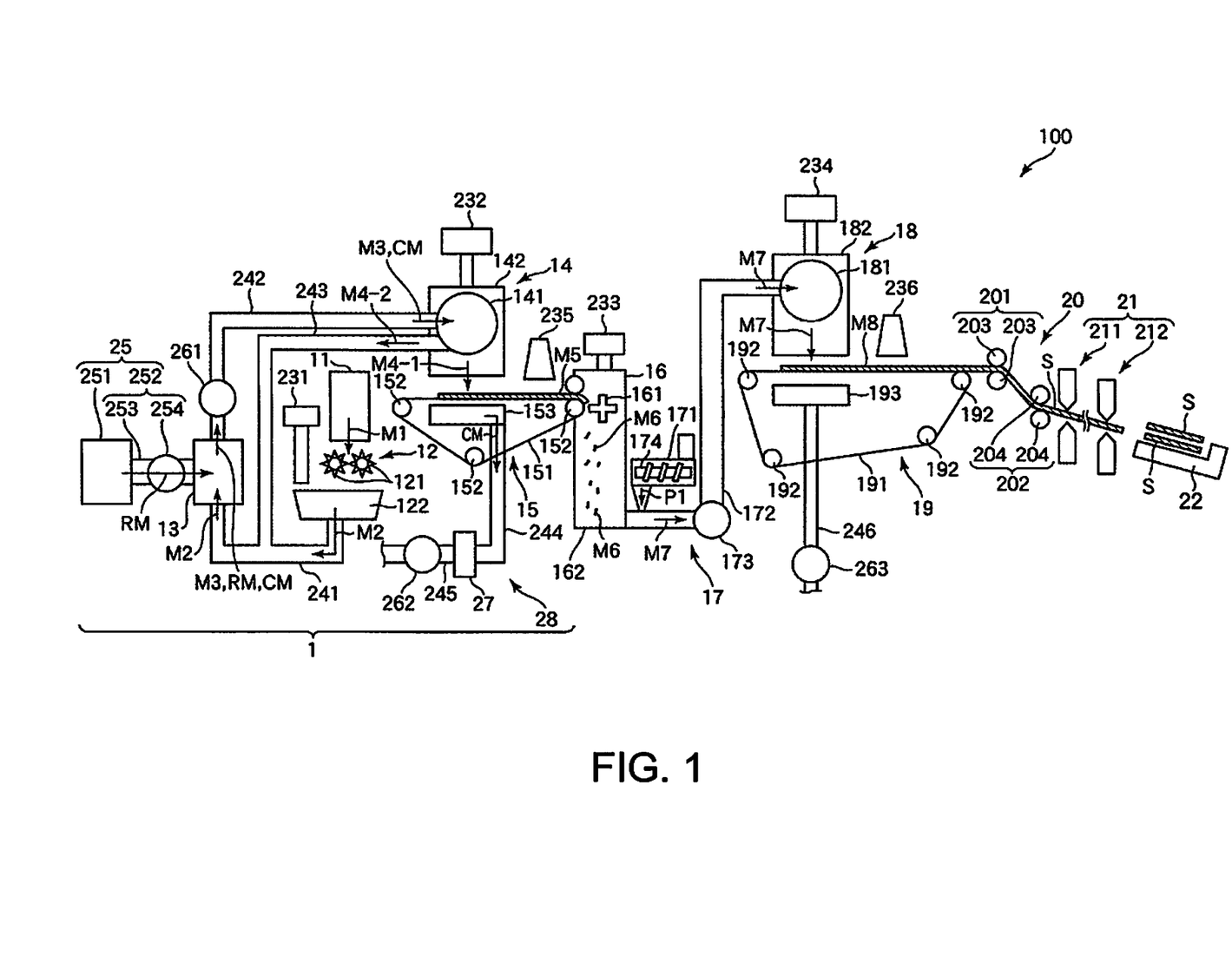
FIG. 1 is a side view schematically illustrating a first embodiment of a sheet manufacturing apparatus according to the invention (including a processing device of the invention).

FIG. 1 is a side view schematically illustrating a first embodiment of a sheet manufacturing apparatus of the invention (including the processing device of the invention).

Figure 2:
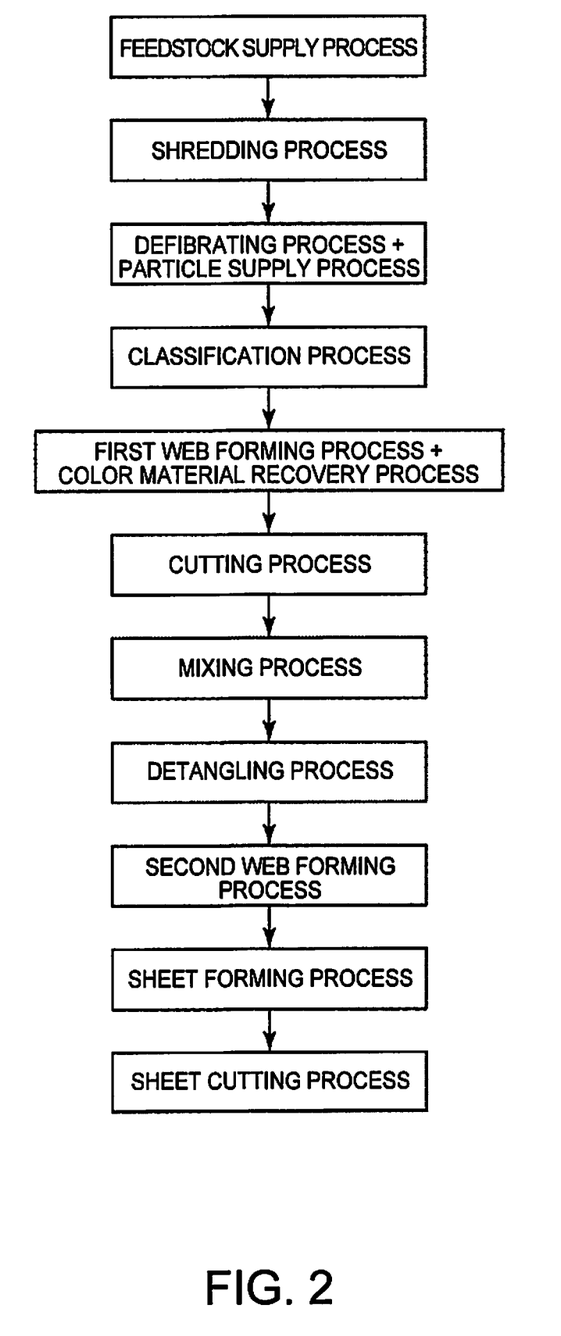
FIG. 2 is a flow chart of steps executed by the sheet manufacturing apparatus shown in FIG. 1.
Figure 3:
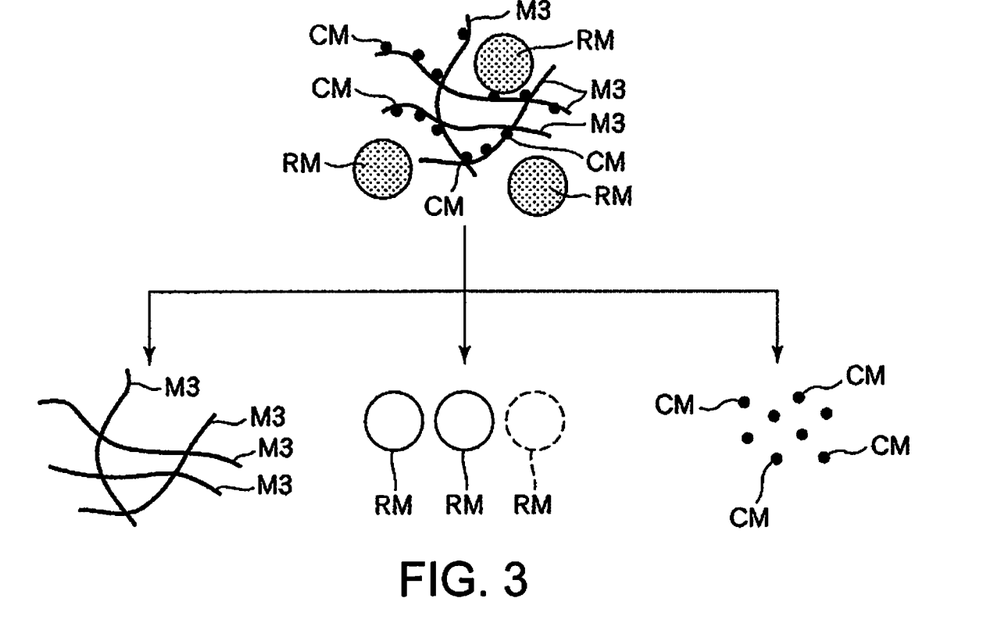
FIG. 3 illustrates supplying particles in the sheet manufacturing apparatus shown in FIG. 1.
Figure 4:
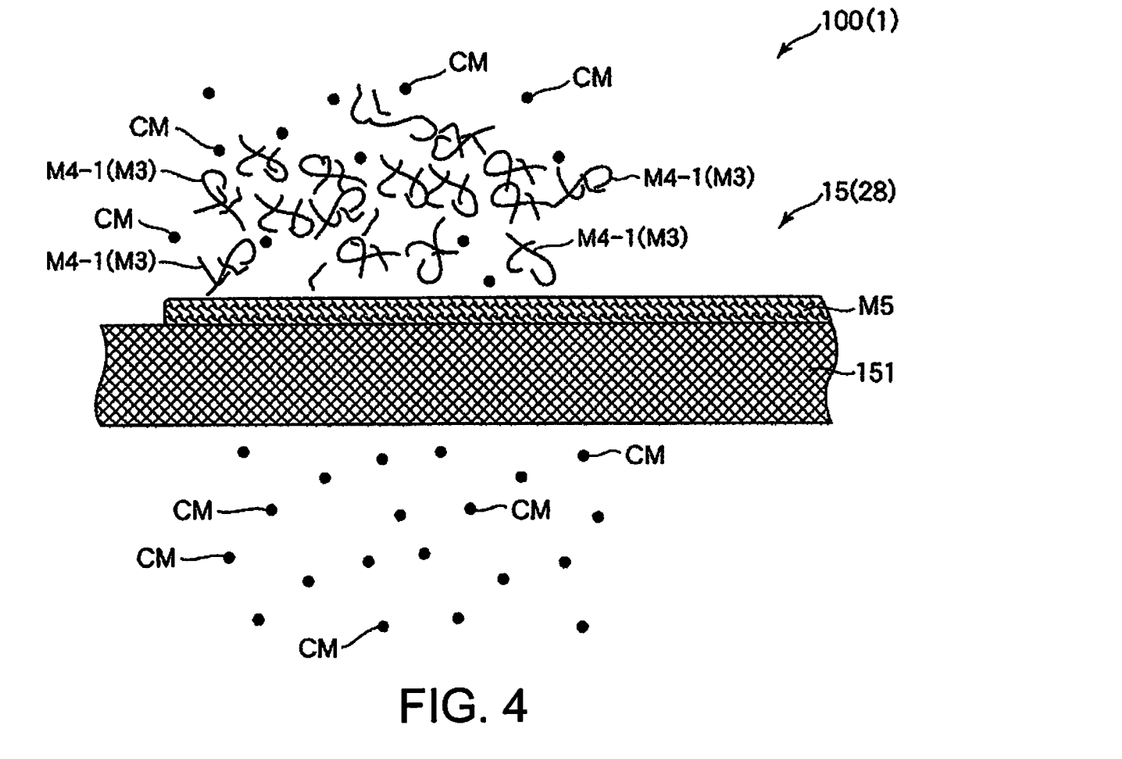
FIG. 4 is a side view illustrating when color material is removed in the sheet manufacturing apparatus shown in FIG. 1.

FIG. 2 is a flow chart of steps executed by the sheet manufacturing apparatus shown in FIG. 1. FIG. 3 illustrates supplying particles in the sheet manufacturing apparatus shown in FIG. 1. FIG. 4 is a side view illustrating when color material is removed in the sheet manufacturing apparatus shown in FIG. 1.

Note that for convenience below, in FIG. 1 and FIG. 4 (and in FIG. 5 and FIG. 7), the side at the top is referred to as up or above; the bottom is referred to as down or below; the left side is referred to as the left or the upstream side; and the right side is referred to as the right or the downstream side.

The sheet manufacturing apparatus 100 shown in FIG. 1 has a feedstock supply device 11, a shredder 12, a defibrator 13, a particle supply device 25, a classifier 14, a first web forming device 15, a cutter 16, a mixing device 17, a detangler 18, a second web forming device 19, a sheet forming device 20, a paper cutter 21, and a stacker 22.

The sheet manufacturing apparatus 100 also has wetting unit 231, wetting unit 232, wetting unit 233, and wetting unit 234.

The operation of the parts of the sheet manufacturing apparatus 100 is controlled by a controller (not shown in the figure).

The sheet manufacturing apparatus 100 also includes a processing device 1. In this embodiment, the processing device 1 comprises the feedstock supply device 11, a shredder 12, a defibrator 13, a particle supply device 25, a classifier 14, and a first web forming device 15.

As shown in FIG. 2, the sheet manufacturing method in this embodiment of the invention includes a feedstock supply process, a shredding process, a defibrating process, a classification process, a first web forming process, a cutting process, a mixing process, a detangling process, a second web forming process, a sheet forming process, and a sheet cutting process. A particle supply process is executed in conjunction with the defibrating process, and a color material recovery process is executed in conjunction with the first web forming process. The sheet manufacturing apparatus 100 can execute these processes sequentially.

Of these processes, the processes executed by the processing device 1 are the feedstock supply process, shredding process, defibrating process, particle supply process, classification process, first web forming process, and color material recovery process.

The configuration of parts of the sheet manufacturing apparatus 100 is described below.

The feedstock supply device 11 is the part that executes the feedstock supply process (see FIG. 2) supplying feedstock M1 to the shredder 12. The feedstock M1 may be any material, such as cut sheets, made from a material containing fiber, particularly including cellulose fiber. In this embodiment of the invention, the feedstock M1 is recovered paper, that is, sheets that have been used, but the sheets are not so limited and may include unused sheets.

Note that the cellulose fiber may be any fibrous material containing mainly cellulose (narrowly defined cellulose) as a chemical compound, and in addition to cellulose (narrowly defined cellulose) may include hemicellulose or lignin.

The shredder 12 is the part that executes the shredding process (see FIG. 2) of shredding the feedstock M1 supplied from the feedstock supply device 11 in air. The shredder 12 has a pair of shredder blades 121 and a chute (hopper) 122.

By turning in mutually opposite directions of rotation, the pair of shredder blades 121 shred the feedstock M1 passing therebetween, that is, cut the feedstock M1 into small shreds M2. The size and shape of the shreds M2 are preferably appropriate to the defibration process of the defibrator 13, and in this example are preferably pieces 100 mm or less on a side, and are further preferably pieces that are greater than or equal to 10 mm and less than or equal to 70 mm per side.

The chute 122 is located below the pair of shredder blades 121, and in this example is funnel-shaped. As a result, the chute 122 can easily catch the shreds M2 that are shredded and dropped by the shredder blades 121.

Above the chute 122, a wetting unit 231 is disposed beside the pair of shredder blades 121. The wetting unit 231 wets the shreds M2 in the chute 122. This wetting unit 231 has a filter (not shown in the figure) containing water, and is configured as a heaterless humidifier (or heated humidifier) that supplies a moist stream of air to the shreds M2 by passing air through the filter. By wet air being supplied to the shreds M2, shreds M2 sticking to the chute 122 due to static electricity can be suppressed.

The chute 122 connects to the defibrator 13 through a conduit (flow channel) 241. The shreds M2 collected in the chute 122 passes through the conduit 241 and are conveyed to the defibrator 13.

The defibrator 13 is the part that executes the defibrating process (see FIG. 2) that defibrates (dry defibrates) the shreds M2 (fibrous material containing fiber) in air (ambient air). Defibrated material M3 can be produced from the shreds M2 by the defibration process of the defibrator 13.

As used herein, defibrate means to break apart and detangle into single individual fibers shreds M2 composed of many fibers bonded together. The resulting detangled fibers are the defibrated material M3. The shape of the defibrated material M3 is strands and ribbons. The defibrated material M3 may also contain clumps, which are multiple fibers tangled together into clumps.

The defibrator 13 in this embodiment of the invention, for example, is configured as an impeller mill having a rotor that turns at high speed, and a liner disposed around the rotor. Shreds M2 introduced to the defibrator 13 are defibrated between the rotor and the liner.

The defibrator 13, by rotation of the rotor, produces an air flow (current) from the shredder 12 to the classifier 14. As a result, shreds M2 can be suctioned from the conduit 241 to the defibrator 13. In addition, after the defibration process, the defibrated material M3 can be fed through another conduit 242 to the classifier 14.

The defibrator 13 includes the function of separating from the fibers materials such as resin particles, color material CM such as ink and toner, and bleeding inhibitors.

To the defibrator 13 configured as described above is connected a particle supply device 25. The particle supply device 25 is the part that supplies dry ice particles RM to the shreds M2 (material containing fiber) being defibrated.

Dry ice as used herein means carbon dioxide in solid form.

The configuration of the particle supply device 25 is described further below.

The defibrator 13 connects to the classifier 14 through conduit (flow path) 242. The defibrated material M3 (material containing fiber after defibration) is conveyed through the conduit 242 to the classifier 14.

A blower 261 is disposed in the conduit 242. The blower 261 is an air flow generator that produces a flow of air to the classifier 14. Conveyance of the defibrated material M3 to the classifier 14 is thereby promoted.

The classifier 14 is the part that executes the classification process (see FIG. 2) of classifying the defibrated material M3 based on the length of the fibers. In the classifier 14, the defibrated material M3 is separated into first screened material M4-1, and second screened material M4-2 that is larger than the first screened material M4-1. The first screened material M4-1 is of a size appropriate to manufacturing sheets S downstream.

The average length of the first screened material M4-1 is preferably greater than or equal to 1 µm and less than or equal to 100 µm. The average aspect ratio is preferably less than 3, and further preferably is less than or equal to 2.

The second screened material M4-2 includes, for example, fiber that has not been sufficiently defibrated, and excessively agglomerated defibrated fibers.

The classifier 14 includes a drum 141, and a housing 142 enclosing the drum 141.

The drum 141 is a sieve comprising a cylindrical mesh body that rotates on its center axis. The defibrated material M3 is introduced to the drum 141. By the drum 141 rotating, defibrated material M3 that is smaller than the mesh passes through and is separated as first screened material M4-1, and defibrated material M3 that is larger than the mesh and therefore does not pass through, is separated as second screened material M4-2.

The first screened material M4-1 drops from the drum 141.

The second screened material M4-2 is discharged to the conduit (flow path) 243 connected to the drum 141. The end of the conduit 243 on the opposite end (downstream end) as the drum 141 is connected to another conduit 241. The second screened material M4-2 that past through the conduit 243 merges with the shreds M2 inside the conduit 241, and is introduced with the shreds M2 to the defibrator 13. As a result, the second screened material M4-2 is returned to the defibrator 13 and past through the defibrating process with the shreds M2.

The first screened material M4-1 from the drum 141 is dispersed while dropping through air, and descends toward the first web forming device 15 (separator). The first web forming device 15 is the part that executes a first web forming process (see FIG. 2) forming a first web M5 from the first screened material M4-1. The first web forming device 15 includes a mesh belt (separation belt) 151, three tension rollers 152, and a suction unit (suction mechanism) 153.

The mesh belt 151 is an endless belt on which the first screened material M4-1 accumulates. This mesh belt 151 is mounted on three tension rollers 152. By rotationally driving the tension rollers 152, the first screened material M4-1 deposited on the mesh belt 151 is conveyed downstream.

The size of the first screened material M4-1 is greater than or equal to the size of the mesh in the mesh belt 151. As a result, passage of the first screened material M4-1 through the mesh belt 151 is limited, and as a result the first screened material M4-1 accumulates on the mesh belt 151. Furthermore, because the first screened material M4-1 is conveyed downstream by the mesh belt 151 as the first screened material M4-1 accumulates on the mesh belt 151, the first screened material M4-1 is formed in a layer as a first web M5.

Color material CM as described below is also mixed with the first screened material M4-1. This color material CM is separated from the first screened material M4-1 (defibrated material M3) by the dry ice particles RM supplied from the particle supply device 25. The color material CM is smaller than the mesh in the mesh belt 151. As a result, color material CM that has been separated from the fiber passes through the mesh belt 151 and drops below.

The suction unit 153 suctions air from below the mesh belt 151. As a result, color material CM that has past through the mesh belt 151 can be suctioned together with the air.

The suction unit 153 is connected to a storage hopper (recovery device) 27 through another conduit (flow path) 244. The color material CM suctioned by the suction unit 153 is recovered into the storage hopper 27 and stored.

Another conduit (flow path) 245 is also connected to the storage hopper 27. A blower 262 is disposed to the conduit 245. Operation of the blower 262 produces suction in the suction unit 153. This promotes formation of the first web M5 on the mesh belt 151. The color material CM has been removed from the material forming the first web M5. Operation of the blower 262 causes the color material CM to pass through the conduit 244 and reach the storage hopper 27.

The housing 142 is connected to a wetting unit 232. Like the wetting unit 231 described above, the wetting unit 232 is a heaterless humidifier. As a result, wet air is supplied into the housing 142. This wet air moistens the first screened material M4-1, and as a result can suppress sticking of the first screened material M4-1 to the inside walls of the housing 142 due to static electricity.

Another wetting unit 235 is disposed downstream from the classifier 14. This wetting unit 235 is configured as an ultrasonic humidifier that mists water. As a result, moisture can be supplied to the first web M5, and the moisture content of the first web M5 can thereby be adjusted. This adjustment can also suppress sticking of the first web M5 to the mesh belt 151 due to static electricity. As a result, the first web M5 easily separates from the mesh belt 151 at the tension roller 152 from where the mesh belt 151 returns to the upstream side.

On the downstream side of the wetting unit 235 is a cutter 16. The cutter 16 is a part that executes a cutting process (see FIG. 2) of cutting the first web M5 that has separated from the mesh belt 151.

The cutter 16 has a propeller 161 that is rotationally supported, and a housing 162 that houses the propeller 161. As the first web M5 is fed into the rotating propeller 161, the first web M5 can be cut into pieces. The cut first web M5 forms segments M6. The segments M6 then drop down in the housing 162.

The housing 162 is connected to another wetting unit 233. Like the wetting unit 231 described above, the wetting unit 233 is a heaterless humidifier. As a result, wet air is supplied into the housing 162. This wet air suppresses sticking of the segments M6 to the propeller 161 and to the inside walls of the housing 162 due to static electricity.

A mixing device 17 is disposed on the downstream side of the cutter 16. The mixing device 17 is the part that executes a mixing process (see FIG. 2) of mixing the segments M6 with resin P1. The mixing device 17 includes a resin supply device 171, a conduit (flow path) 172, and a blower 173.

The conduit 172 connects to the housing 162 of the cutter 16 and the housing 182 of the detangler 18, and is a flow path through which a mixture M7 of the segments M6 and resin P1 passes.

The resin supply device 171 connects to the conduit 172. The resin supply device 171 has a screw feeder 174. By rotationally driving the screw feeder 174, the resin P1 can be supplied in powder or particle form to the conduit 172. The resin P1 supplied to the conduit 172 is mixed with the segments M6, forming the mixture M7.

Note that the resin P1 bonds fibers together in a downstream process, and may be a thermoplastic resin or a thermosetting resin, but is preferably a thermoplastic resin.

Examples of such thermoplastic resins include AS resin, ABS resin, polyethylene, polypropylene, ethylene-vinylacetate copolymer (EVA), or other polyolefin, denatured polyolefins, polymethylmethacrylate or other acrylic resin, polyvinyl chloride, polystyrene, polyethylene terephthalate, polybutylene terephthalate or other polyesters, nylon 6, nylon 46, nylon 66, nylon 610, nylon 612, nylon 11, nylon 12, nylon 6-12, nylon 6-66 or other polyimide (nylon), polyphenylene ether, polyacetal, polyether, polyphenylene oxide, polyether ether ketone, polycarbonate, polyphenylene sulfide, thermoplastic polyimide, polyether imide, aromatic polyester, or other liquid crystal polymer, styrenes, polyolefins, polyvinyl chlorides, polyurethanes, polyesters, polyimides, polybutadienes, transpolyisoprenes, fluoroelastomers, polyethylene chlorides and other thermoplastic elastomers, as well as combinations of one or two or more of the foregoing. Preferably, a polyester or resin containing a polyester is used as the thermoplastic resin.

Additives other than resin P1 may also be supplied from the resin supply device 171, including, for example, coloring agents for adding color to the fiber, anti-blocking agents for suppressing clumping of the fiber and clumping of the resin P1, and flame retardants for making the fiber and manufactured sheets difficult to burn.

The blower 173 is disposed to the conduit 172 downstream from the resin supply device 171. The blower 173 is configured to produce an air current toward the detangler 18. This air current can also mix the segments M6 and resin P1 inside the conduit 172. As a result, the mixture M7 can be introduced to the detangler 18 as a uniform dispersion of the segments M6 and resin P1. The segments M6 in the mixture M7 are further detangled into smaller fibers while travelling through the conduit 172.

The detangler 18 is the part that executes the detangling process (see FIG. 2) that detangles interlocked fibers in the mixture M7.

The detangler 18 includes a drum 181 and a housing 182 that houses the drum 181.

The drum 181 is a sieve comprising a cylindrical mesh body that rotates on its center axis. The mixture M7 is introduced to the drum 181. By the drum 181 rotating, fiber in the mixture M7 that is smaller than the mesh can pass through the drum 181. The mixture M7 is detangled in this process.

The mixture M7 that is detangled in the drum 181 is dispersed while dropping through air, and falls to the second web forming device 19 located below the drum 181. The second web forming device 19 is the part that executes the second web forming process (see FIG. 2) forming a second web M8 from the mixture M7. The second web forming device 19 includes a mesh belt (separation belt) 191, tension rollers 192, and a suction unit (suction mechanism) 193.

The mesh belt 191 is an endless belt on which the mixture M7 accumulates. This mesh belt 191 is mounted on four tension rollers 192. By rotationally driving the tension rollers 192, the mixture M7 deposited on the mesh belt 191 is conveyed downstream.

Most of the mixture M7 on the mesh belt 191 is larger than the mesh in the mesh belt 191. As a result, the mixture M7 is suppressed from passing through the mesh belt 191, and therefore accumulates on the mesh belt 191. The mixture M7 is conveyed downstream by the mesh belt 191 as the mixture M7 accumulates on the mesh belt 191, and is formed in a layer as the second web M8.

The suction unit 193 suctions air down from below the mesh belt 191. As a result, the mixture M7 can be pulled onto the mesh belt 191, and accumulation of the mixture M7 on the mesh belt 191 is thereby promoted.

Another conduit (flow path) 246 is connected to the suction unit 193. A blower 263 is also disposed to the conduit 246. Operation of the blower 263 produces suction in the suction unit 193.

Another wetting unit 234 is connected to the housing 182. Like the wetting unit 231 described above, the wetting unit 234 is a heaterless humidifier. As a result, wet air is supplied into the housing 182. By humidifying the inside of the housing 182 by adding wet air, sticking of the mixture M7 to the inside walls of the housing 182 due to static electricity can be suppressed.

Another wetting unit 236 is disposed below the detangler 18. This wetting unit 236 is configured as an ultrasonic humidifier similarly to the wetting unit 235 described above. As a result, moisture can be supplied to the second web M8, and the moisture content of the second web M8 can thereby be adjusted. This adjustment can also suppress sticking of the second web M8 to the mesh belt 191 due to static electricity. As a result, the second web M8 easily separates from the mesh belt 191 at the tension roller 192 from where the mesh belt 191 returns to the upstream side.

A sheet forming device 20 is disposed downstream from the second web forming device 19. The sheet forming device 20 is the part that executes the sheet forming process (see FIG. 2) forming sheets S from the second web M8. This sheet forming device 20 includes a calender 201 and a heater 202.

The calender 201 comprises a pair of calender rolls 203, which compress without heating the second web M8 therebetween. This process increases the density of the second web M8. The second web M8 is then conveyed toward the heater 202. Note that one of the pair of calender rolls 203 is a drive roller that is driven by operation of a motor (not shown in the figure), and the other is a driven roller.

The heater 202 has a pair of heat rollers 204, which heat while compressing the second web M8 passing therebetween. The combination of heat and pressure melts the resin P1 in the second web M8, and bonds fibers through the molten resin P1. As a result, a sheet S is formed.

The sheet S is then conveyed to the paper cutter 21. Note that one of the pair of heat rollers 204 is a drive roller that is driven by operation of a motor (not shown in the figure), and the other is a driven roller.

A paper cutter 21 is disposed downstream from the sheet forming device 20. The paper cutter 21 is the part that executes the sheet cutting process (see FIG. 2) that cuts the continuous sheet S into single sheets S. The paper cutter 21 includes a first cutter 211 and a second cutter 212.

The first cutter 211 cuts the sheet S in the direction crosswise to the conveyance direction of the sheet S.

The second cutter 212 is downstream from the first cutter 211, and cuts the sheets S in the direction parallel to the conveyance direction of the sheet S.

Sheets S of a desired size are produced by the cutting action of the first cutter 211 and the second cutter 212. The sheets S are then conveyed further downstream and stacked in a stacker 22.

As described above, a particle supply device 25 is connected to (or disposed to) the defibrator 13 (see FIG. 1). The particle supply device 25 is the part that executes the particle supply process (see FIG. 2) supplying dry ice particles RM to the defibrated material M3 (material containing fiber) being defibrated in the defibrator 13. In this embodiment of the invention, the particle supply process is executed on the defibrated material M3 in air simultaneously to the defibrating process.

In FIG. 1, the particle supply device 25 is shown connected to the middle of the defibrator 13, but is not necessarily limited to this configuration and may be configured in other ways enabling supplying dry ice particles RM to the defibrator 13. For example, the particle supply device 25 may be connected to the conduit 241 on the upstream side of the defibrator 13, and deliver the shreds M2 conveyed from the chute 122 with the particles RM to the defibrator 13.

In this embodiment of the invention, the feedstock M1 is recovered paper, that is, sheets that have been printed on. As a result, as shown in FIG. 3, the defibrated material M3 (material containing fiber) includes color material CM, that is, has color material CM adhering thereto. The color material CM may be, for example, black or colored toner, ink, dyes, or pigments.

The particles RM supplied from the particle supply device 25 function to separate (remove) color material CM from the defibrated material M3 (material containing fiber) by colliding in the defibrator 13 with the color material CM contained in the defibrated material M3 (material containing fiber). As shown in FIG. 3, by the particles RM exhibiting this separation function, the color material CM is reliably removed from the defibrated material M3. In this way, the particles RM function as removal particles that remove the color material CM from the defibrated material M3. When the color material CM is toner, the particles RM are particularly effective as removal particles.

The defibrated material M3 (material containing fiber) from which the color material CM is separated (released) is used to form sheets in a downstream process (sheet forming process). The particles RM then contact air (ambient air) and warm, sublimate and disappear by the time the defibrated material M3 (material containing fiber) is formed into a sheet. The particles RM preferably are preferably lost (sublimate, disappear) before reaching the state shown in FIG. 4. As a result, separation and recovery of the color material CM is more reliable.

After the particles RM are used to separate the color material CM, the particles RM are eliminated from within the sheet manufacturing apparatus 100 (processing device 1) by sublimation. As a result, leaving particles RM that could become an impurity in the sheet S is prevented, and high quality sheets S can be manufactured. Furthermore, the need to provide a separate means of recovering the particles RM in the sheet manufacturing apparatus 100 is eliminated, and the configuration of the sheet manufacturing apparatus 100 is simplified.

For example, in this embodiment of the invention as shown in FIG. 1, the particles RM are discharged from the defibrator 13 with the defibrated material M3 and with the color material CM separated from the defibrated material M3 into the conduit 242, but sublimate while passing through the conduit 242. As a result, the defibrated material M3 and color material CM flow into the classifier 14 on the downstream side of the conduit 242 without the particles RM.

Note that the length of the conduit 242 is set to a length enabling the particles RM to sublimate while the particles RM pass through the conduit 242. Note also that the particles RM may include particles RM that sublimate inside the defibrator 13 (see FIG. 3).

The particle supply device 25 also has a storage tank 251. The storage tank 251 is a tank for storing the particles RM.

The size (particle size) of the particles RM is maintained inside the storage tank 251. A configuration capable of manufacturing particles RM as necessary may also be used as the storage tank 251.

Between the storage tank 251 and the defibrator 13, the particle supply device 25 has an injector 252 that is connected (or disposed) to the defibrator 13, and injects particles RM to the defibrated material M3 (material containing fiber) in the defibrator 13.

The injector 252 includes a conduit 253 and a blower 254.

Note that the particle supply device 25 may be disposed inside the defibrator 13, or disposed in unison with the defibrator 13.

The conduit 253 connects the storage tank 251 and the defibrator 13. The particles RM can pass inside the conduit 253 from the storage tank 251 to the defibrator 13.

The blower 254 is disposed within the length of the conduit 253. The blower 254 generates an air current flowing to the defibrator 13. As a result, the particles RM pass inside the conduit 253 and are injected into the defibrator 13. Included in the injected particles RM are particles that strike the color material CM adhering to the defibrated material M3. As a result, the particles RM can exhibit a peeling function that separates the color material CM from the defibrated material M3, and therefore can reliably remove the color material CM from the defibrated material M3.

Note that the speed (injection velocity) of the particles RM injected into the defibrator 13 is not specifically limited, and may be set appropriately according to the component materials and size of the particles RM.

The temperature of the particles RM is also not specifically limited, but considering the balance between the time to sublimation and hardness, is preferably greater than or equal to $-110°$ C. and less than or equal to $-70°$ C.

By injecting the particles RM, the defibrated material M3 (material containing fiber) is stirred and contacts the particles RM. As a result, contact between the color material CM adhering to the defibrated material M3 and the particles RM is promoted, and the color material CM can be sufficiently removed from the defibrated material M3.

The average particle diameter of the particles RM (powder) supplied to the defibrated material M3 (material containing fiber) is preferably in the range of greater than or equal to 50 μm and less than or equal to 1000 μm, and further preferably in the range of greater than or equal to 100 μm and less than or equal to 500 μm. As a result, the particles RM can effectively separate the color material CM from the defibrated material M3. If the average particle size is less than the lower limit, depending on such conditions as the type and amount of color material CM, the particles RM may not sufficiently separate the color material CM from the defibrated material M3 even if the particles RM collide with the color material CM. In addition, if the average particle size is greater than the upper limit, depending on the size of the defibrated material M3, the particles RM may be too large relative to the defibrated material M3, and may damage the defibrated material M3 when colliding with the defibrated material M3.

As shown in FIG. 1, the sheet manufacturing apparatus 100 (processing device 1) has a color material recovery device 28 configured to execute the color material recovery process (see FIG. 2) of recovering color material CM separated from the defibrated material M3 (material containing fiber) by contact with the particles RM. This recovery process separates the first web M5 and defibrated material M3 from the color material CM that can be discarded.

Note that in this embodiment, the color material recovery process is applied to the defibrated material M3 at the same time as the first web forming process.

In the configuration shown in FIG. 1, the color material recovery device 28 includes the first web forming device 15, storage hopper 27, conduit 244, conduit 245, and blower 262.

As described above, the defibrated material M3 is separated into first screened material M4-1 and second screened material M4-2 by the classifier 14 above the first web forming device 15. As shown in FIG. 4, color material CM that was separated is mixed with the first screened material M4-1. The first screened material M4-1 drops with the color material CM onto the mesh belt 151 of the first web forming device 15. Note that particles RM that did not completely sublimate may be mixed with the first screened material M4-1. In this case, the particles RM can also be recovered with the color material CM by the color material recovery device 28.

The color material recovery device 28 separates and recovers color material CM using differences in the size (particle diameter) of the first screened material M4-1 (fiber) and the color material CM. In other words, the color material recovery device 28 has a mesh belt 151 (screen) with mesh sized so that the color material CM passes through the mesh belt 151 but the first screened material M4-1 is prevented from passing through. As a result, as shown in FIG. 4, the first screened material M4-1 accumulates on the mesh belt 151, forming a first web M5.

On the other hand, the color material CM is pulled through the mesh belt 151 by the suction force of the suction unit 153, and then sequentially passes through the suction unit 153 and conduit 244, and is recovered into the storage hopper 27. As a result, the first web M5 is formed with the color material CM removed. The first web M5 is then conveyed to the downstream processes, and processed into the final sheets S.

Furthermore, even if some particles RM remain in the first screened material M4-1, those particles RM can be recovered with the color material CM by the color material recovery device 28.

As described above, in the sheet manufacturing apparatus 100 (processing device 1), even if color material CM is contained in the recovered paper used as the feedstock M1 for remanufacturing sheets, the color material CM is separated and removed by the particles RM supplied from the particle supply device 25, and the separated color material CM is then captured by the color material recovery device 28. As a result, the manufactured sheets S are high quality sheets S from which color material has been removed.

Embodiment 2

Figure 5:
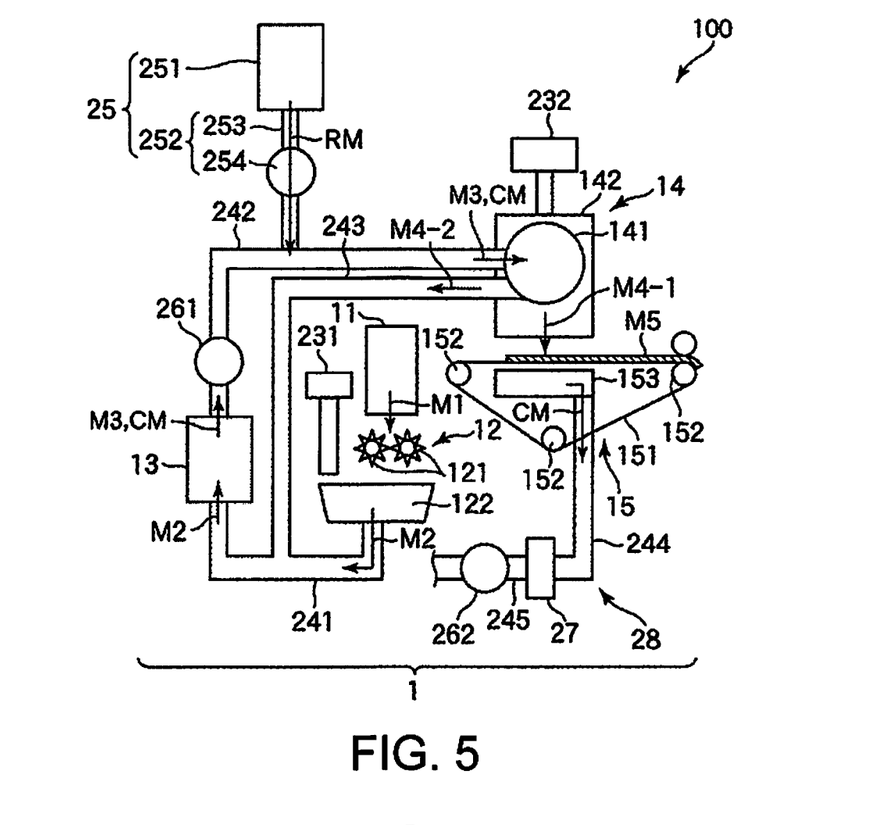
FIG. 5 is a side view schematically illustrating the upstream side of a second embodiment of a sheet manufacturing apparatus according to the invention (including a processing device of the invention).
Figure 6:
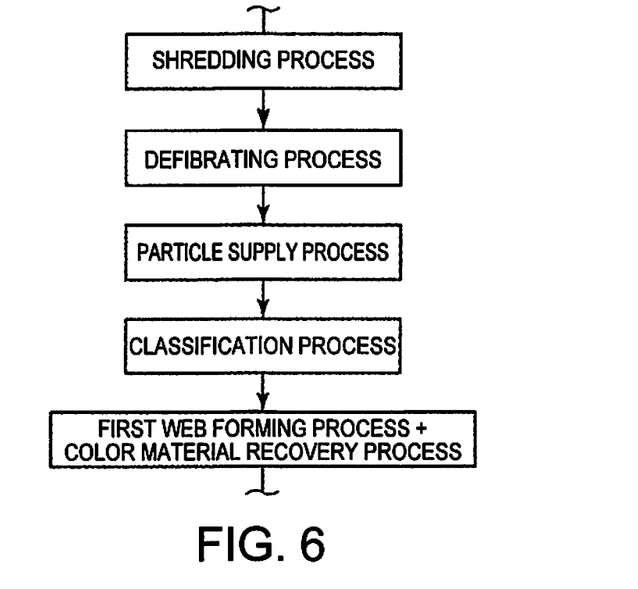
FIG. 6 is a flow chart of steps executed by the sheet manufacturing apparatus shown in FIG. 5.

FIG. 5 is a side view schematically illustrating the upstream side of a second embodiment of a sheet manufacturing apparatus according to the invention (including a processing device of the invention). FIG. 6 is a flow chart of steps executed by the sheet manufacturing apparatus shown in FIG. 5.

A processing device, a sheet manufacturing apparatus, a processing method, and a sheet manufacturing method according to this second embodiment of the invention are described below with reference to the accompanying figures, focusing on the differences with the foregoing embodiment and omitting or simplifying further description of like parts.

This embodiment of the invention is the same as the first embodiment described above except that the particle supply device is disposed in a different location, and as a result, the timing of the particle supply process also differs.

As shown in FIG. 5, the sheet manufacturing apparatus 100 (processing device 1) has a conduit (flow path) 242 that is connected to the defibrator 13 and through which the defibrated material M3 (material containing fiber after defibration) passes.

In this embodiment of the invention, the particle supply device 25 executes the particle supply process after the defibrating process, that is, after supplying particles RM of dry ice to the defibrated material M3 (material containing fiber after defibration) (see FIG. 6).

The particle supply device 25 in this embodiment has an injector 252 that is connected to the conduit (flow path) 242 on the downstream side of the blower 261, and injects particles RM to the defibrated material M3 (material containing fiber) passing through the conduit (flow path) 242. As a result, particles RM can be supplied to the defibrated material M3 after being sufficiently defibrated.

By supplying the particles RM in this way, the particles RM can contact a greater portion of the defibrated material M3, and as a result can better collide with and contact the color material CM. As a result, the separation function of the particles RM can be sufficiently executed, and color material CM can be more consistently removed from the defibrated material M3.

Embodiment 3

Figure 7:
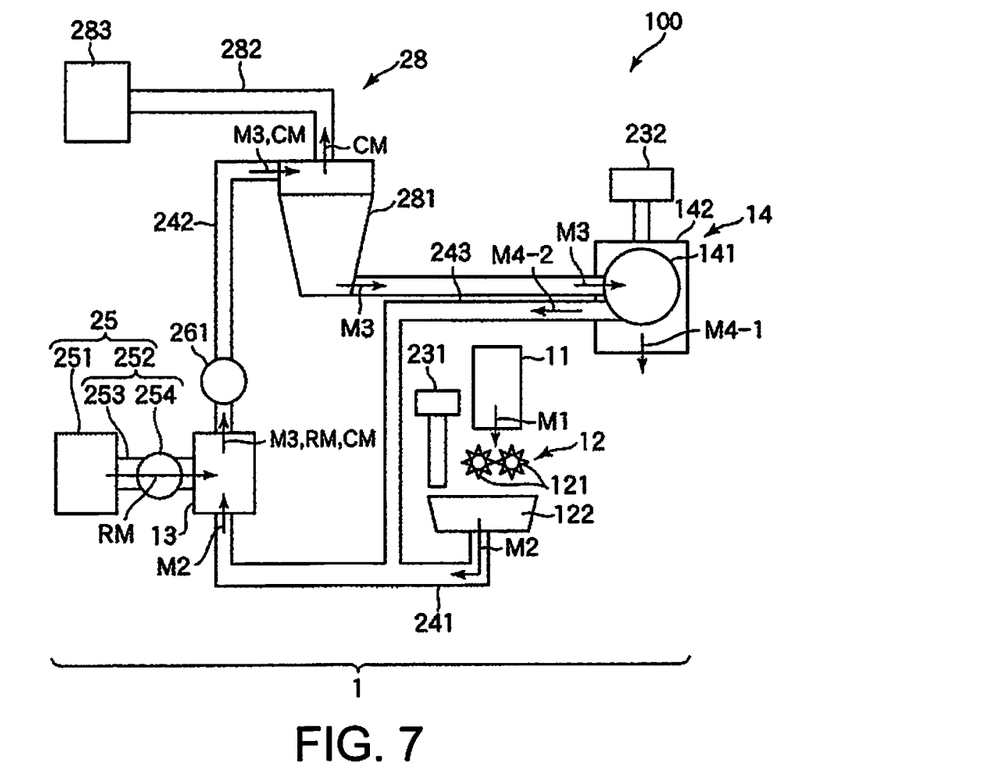
FIG. 7 is a side view schematically illustrating the upstream side of a third embodiment of a sheet manufacturing apparatus according to the invention (including a processing device of the invention).
Figure 8:
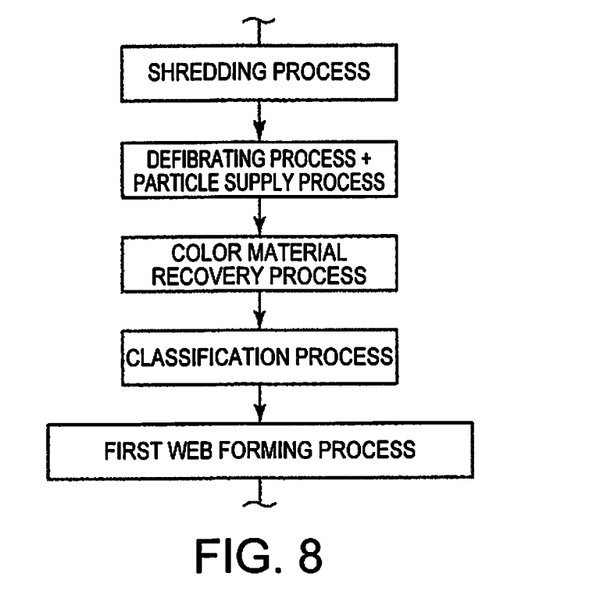
FIG. 8 is a flow chart of steps executed by the sheet manufacturing apparatus shown in FIG. 8.

FIG. 7 is a side view schematically illustrating the upstream side of a third embodiment of a sheet manufacturing apparatus according to the invention (including a processing device of the invention). FIG. 8 is a flow chart of steps executed by the sheet manufacturing apparatus shown in FIG. 8.

A processing device, a sheet manufacturing apparatus, a processing method, and a sheet manufacturing method according to this third embodiment of the invention are described below with reference to the accompanying figures, focusing on the differences with the foregoing embodiments and omitting or simplifying further description of like parts.

This embodiment of the invention is the same as the first embodiment described above except that the color material recovery device is disposed in a different location, and the configuration of the color material recovery device differs.

As shown in FIG. 7, the color material recovery device 28 in this embodiment is disposed to the conduit 242, and is downstream from the blower 261. As a result, the color material recovery process of the color material recovery device 28 is executed after the defibrating process (see FIG. 8).

The color material recovery device 28 uses differences in the specific gravity of the defibrated material M3 (material containing fiber) and the color material CM to separate and recover the color material CM. More specifically, the color material recovery device 28 is configured to separate color material CM centrifugally, and includes a centrifugal classifier 281, conduit 282, and storage tank 283. The centrifugal classifier 281 and storage tank 283 are connected through the conduit 282.

The centrifugal classifier 281 is disposed and connected to the conduit 242. The defibrated material M3 and color material CM conveyed through the conduit 242 is introduced at the same time to the centrifugal classifier 281. Then, by centrifugal separation by the centrifugal classifier 281, the defibrated material M3 flowing downstream through the conduit 242 to the classifier 14 is separated from the color material CM directed to the conduit 282. The color material CM directed to the conduit 282 is then stored in the storage tank 283.

The color material recovery device 28 thus comprised can reliably remove the color material CM from the defibrated material M3.

Embodiment 4

Figure 9:
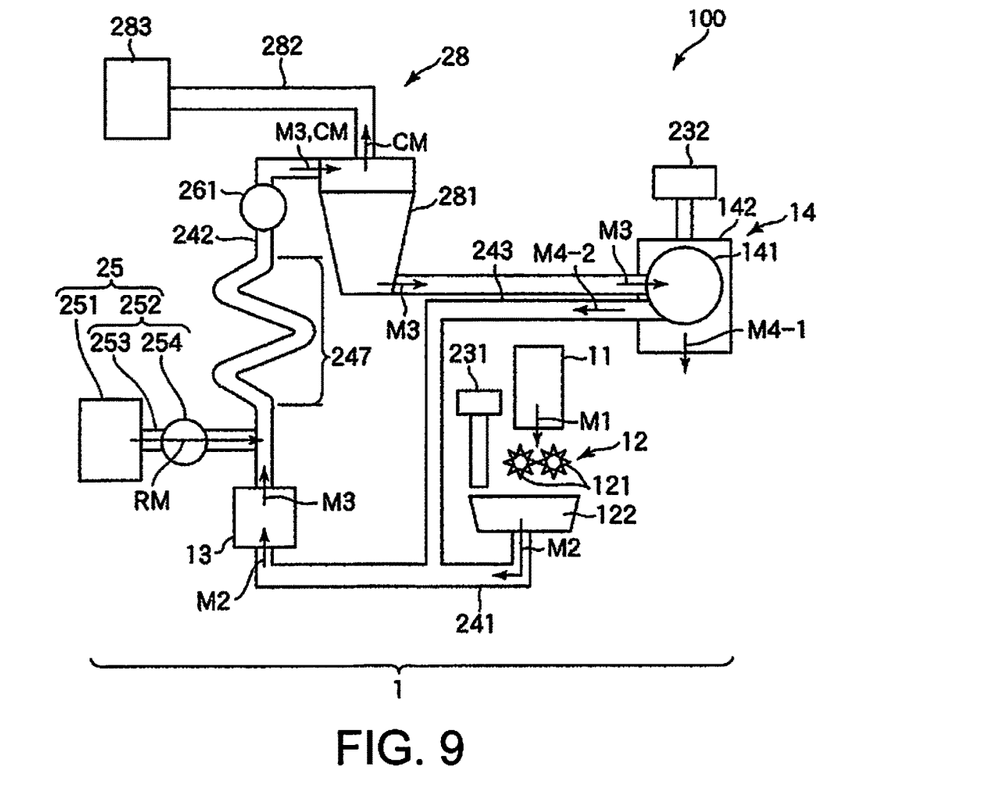
FIG. 9 is a side view schematically illustrating the upstream side of a fourth embodiment of a sheet manufacturing apparatus according to the invention (including a processing device of the invention).
Figure 10:
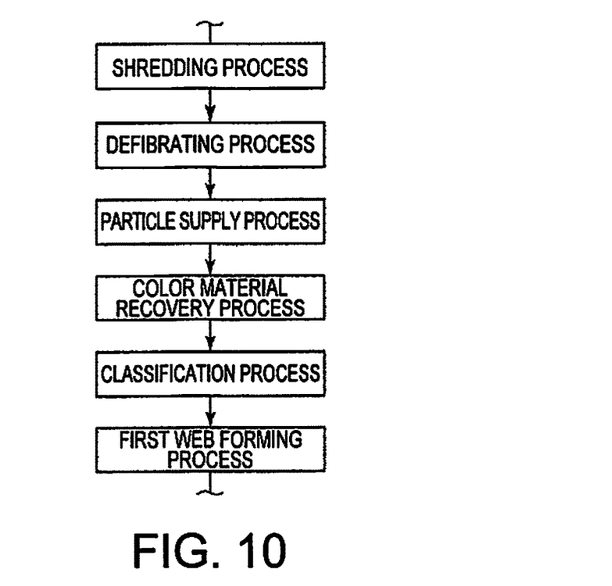
FIG. 10 is a flow chart of steps executed by the sheet manufacturing apparatus shown in FIG. 9.

FIG. 9 is a side view schematically illustrating the upstream side of a fourth embodiment of a sheet manufacturing apparatus according to the invention (including a processing device of the invention). FIG. 10 is a flow chart of steps executed by the sheet manufacturing apparatus shown in FIG. 9.

A processing device, a sheet manufacturing apparatus, a processing method, and a sheet manufacturing method according to this fourth embodiment of the invention are described below with reference to the accompanying figures, focusing on the differences with the foregoing embodiment and omitting or simplifying further description of like parts.

This embodiment differs from the foregoing third embodiment in the location of the particle supply device.

As shown in FIG. 9, the particle supply device 25 in this embodiment is located and connected to the conduit 242 on the upstream side of the color material recovery device 28. As a result, the particle supply process of the particle supply device 25 is executed after the defibrating process, and the color material recovery process is executed after the particle supply process (see FIG. 10).

Note that the particle supply device 25 is disposed upstream from the color material recovery device 28, and is further preferably disposed upstream from the blower 261.

The conduit 242 also has a bending segment 247 winding between the connection to the particle supply device 25 and the blower 261. This increases opportunities for the particles RM to collide with the color material CM as the particles RM pass through the bending segment 247, thus promoting absorption of the color material CM by the particles RM.

In addition, the velocity of the particles RM through the conduit 242 is increased by the action of the blower 261. As a result, opportunities for the particles RM to collide with the defibrated material M3 are increased, and separation of the color material CM from the defibrated material M3 is promoted by contact of the particles RM with the color material CM adhering to the defibrated material M3.

The particles RM that removed color material CM may also be recovered with the color material CM by the color material recovery device 28.

Furthermore, even if some particles RM remain in the defibrated material M3, the particles RM can be recovered with the color material CM by the color material recovery device 28.

A processing device, a sheet manufacturing apparatus, a processing method, and a sheet manufacturing method according to the invention are described above, but the invention is not limited thereto. Parts of the processing device and sheet manufacturing apparatus may also replaced with equivalent configurations exhibiting the same function. Other configurations may also be added as desired.

Furthermore, the processing device, sheet manufacturing apparatus, processing method, and sheet manufacturing method of the invention may also be embodied by any two or more configurations (features) described herein.

Furthermore, the particles for removing color material may be supplied (bombard) multiple times (at different locations of the processing device). In this event, the particle diameter of the particles may differ each time the particles are supplied. For example, large particles may be supplied the first time, and smaller particles may be supplied the next time. This configuration improves efficiency removing the color material.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

The entire disclosure of Japanese Patent Application No. 2017-085119, filed Apr. 24, 2017 is expressly incorporated by reference herein.

What is claimed is:

1. A processing device comprising:
a defibrator configured to defibrate fibrous material containing fiber in air; and
a particle supply device configured to supply particles of dry ice to the material containing fiber during defibration or after defibration.

2. The processing device described in claim 1, wherein:
the material containing fiber contains color material; and
the particles separate the color material from the fibers by colliding with the color material contained in the material containing fiber.

3. The processing device described in claim 2, further comprising:
a color material recovery device configured to recover color material that was separated by collision with the particles.

4. The processing device described in claim 3, wherein:
the color material recovery device uses differences in a size of the fiber and the color material to segregate and recover the color material.

5. The processing device described in claim 3, wherein:
the color material recovery device uses differences in specific gravity of the fiber and the color material to segregate and recover the color material.

6. The processing device described in claim 2, wherein:
the material containing fiber from which the color material was separated is formed into a sheet; and
the particles sublimate before the material containing fiber is formed into the sheet.

7. The processing device described in claim 1, wherein:
the particle supply device has an injector connected or disposed to the defibrator, and configured to inject the particles toward the material containing fiber in the defibrator.

8. The processing device described in claim 1, further comprising:
a flow path connected to the defibrator and carrying the material containing fiber after defibration; and
the particle supply device has an injector connected to the flow path, and configured to inject the particles toward the material containing fiber passing through the flow path.

9. The processing device described in claim 7, wherein:
the material containing fiber is stirred and contacts the particles as a result of injecting the particles.

10. The processing device described in claim 1, wherein:
an average particle diameter of the particles when supplied to the material containing fiber is greater than or equal to 50 µm and less than or equal to 1000 µm.

11. A sheet manufacturing apparatus comprising the processing device described in claim 1.

12. A processing method comprising:
a defibrating process of defibrating fibrous material containing fiber in air; and
a particle supply process of supplying particles of dry ice to the material containing fiber during defibration or after defibration.

13. A sheet manufacturing method comprising:
a defibrating process of defibrating fibrous material containing fiber in air;
a particle supply process of supplying particles of dry ice to the material containing fiber during defibration or after defibration; and
manufacturing a sheet from the material containing fiber after supplying the particles.

* * * * *